(12) United States Patent
Bonilla et al.

(10) Patent No.: US 8,739,169 B2
(45) Date of Patent: May 27, 2014

(54) METHOD FOR MONITORING OPERATING EXPERIENCES OF IMAGES TO IMPROVE WORKLOAD OPTIMIZATION IN CLOUD COMPUTING ENVIRONMENTS

(75) Inventors: Milton A. Bonilla, Somers, NY (US); Brian D. Goodman, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/764,048

(22) Filed: Apr. 20, 2010

(65) Prior Publication Data

US 2011/0258634 A1    Oct. 20, 2011

(51) Int. Cl.
*G06F 9/46* (2006.01)
*G06F 15/16* (2006.01)
*G06F 15/173* (2006.01)

(52) U.S. Cl.
USPC ............ 718/104; 718/105; 709/224; 709/201

(58) Field of Classification Search
None
See application file for complete search history.

(56) References Cited

U.S. PATENT DOCUMENTS

| | | | |
|---|---|---|---|
| 7,320,131 B1 * | 1/2008 | O'Toole, Jr. | 718/104 |
| 7,356,591 B2 * | 4/2008 | Mousseau et al. | 709/224 |
| 7,444,538 B2 * | 10/2008 | Sciacca | 714/4.1 |
| 7,500,001 B2 | 3/2009 | Tameshige | |
| 7,788,380 B2 * | 8/2010 | Shim et al. | 709/226 |
| 7,870,044 B2 * | 1/2011 | Robertson | 705/34 |
| 8,104,038 B1 * | 1/2012 | Graupner | 718/104 |
| 2000/9022896 | 9/2009 | Gbadegesin et al. | |
| 2009/0259345 A1 | 10/2009 | Kato et al. | |
| 2009/0276771 A1 | 11/2009 | Nickolov et al. | |
| 2009/0293056 A1 | 11/2009 | Ferris et al. | |
| 2009/0300210 A1 | 12/2009 | Ferris | |
| 2009/0300607 A1 | 12/2009 | Ferris et al. | |

OTHER PUBLICATIONS

Brandic,I, "Towards Self-Manageable Cloud Services," Computer Software and Applications Conference , pp. 128-33,Jul. 24, 2009.
Li et al."Performance model driven QoS guarantees and optimization in clouds," ICSE Workshop on Software Engineering Challenges of Cloud Computing,pp. 15-22,May 23, 2009.
Jamal et al. "Virtual Machine Scalability on Multi-Core Processors Based Servers for Cloud Computing Workloads," IEEE International Conference on Networking, Architecture, and Storage, pp. 90-97,Jul. 11, 2009.

(Continued)

*Primary Examiner* — Camquy Truong
(74) *Attorney, Agent, or Firm* — Cahn & Samuels, LLP

(57) ABSTRACT

An embodiment of the invention includes a method for workload optimization in a network (e.g., cloud computing environment). Usage of resources in the network is monitored in order to maintain a metadata catalog of operating experiences of the resources. A request for a resource in the network is received; and, resources that are available in the network are identified. Units that are included in the resources are also identified. The metadata catalog is queried for operating experiences associated with the requested resource. The requested resource is provisioned by the host system based on the operating experiences associated with the resource. This includes assembling the units that are included in the requested resource and/or automatically allocating workloads of the computing modules based on the cataloging of the workloads in the metadata catalog. The metadata catalog is updated with an operating experience associated with the provisioning of the requested resource.

24 Claims, 5 Drawing Sheets

(56) References Cited

OTHER PUBLICATIONS

Quiroz et al. "Towards autonomic workload provisioning for enterprise Grids and clouds," IOth IEEE/ACM International Conference on Grid Computing, pp. 50-59, Oct. 15, 2009.

Stage, A, Setzer, T, "Network-aware migration control and scheduling of differentiated virtual machine workloads," ICSE Workshop on Software Engineering Challenges of Cloud Computing, pp. 9-14, May 23, 2009.

Van, Hien Nguyen et al, Autonomic virtual resource management for service hosting platforms, Proceedings of the 20Og ICSE Workshop on Software Engineering Challenges of Cloud Computing, CLOUD 2009, IEEE Computer Society, Oct. 16, 2009.

* cited by examiner

METHOD FOR MONITORING OPERATING EXPERIENCES OF IMAGES TO IMPROVE WORKLOAD OPTIMIZATION IN CLOUD COMPUTING ENVIRONMENTS

BACKGROUND

The present invention relates to network environments, and more specifically, to systems, methods, and computer program products for monitoring operating experiences of images to improve workload optimization in virtualized systems (e.g., cloud computing environments).

Over-committing resources to virtualized systems allows more systems to co-exist on the same physical hardware. To maximize operation in a virtualized infrastructure, workloads across physical resources are optimized. Processes for optimizing workloads are often identified at the time that an image is provisioned, wherein the processes are further updated as needed thereafter. Images are the foundation bits that allow the virtualization system to constitute an instance.

In order to fit resources onto underutilized host systems, existing virtualized systems often use minimum requirements for running the images. Moreover, the method of hot migration is often used to rebalance workloads in virtualized systems. Other virtualized systems require the systems operator to select an appropriate host system.

SUMMARY

An embodiment of the invention includes a method for workload optimization in a network (e.g., cloud computing environment). Usage of resources in the network is monitored in order to maintain a metadata catalog of operating experiences of the resources. The operating experiences include: minimum system requirements for running the resources, software utilized by the resources, hardware utilized by the resources, network connections used by the resources, CPU usage of the resources, RAM usage of the resources, hard drive usage of the resources, external storage device usage by the resources, errors encountered while provisioning the resources, stability of the resources, uptime of the resources, a system that previously provisioned the resource, a list of resources on the host system, a location of the host system, and/or workloads of computing modules in the network during provisioning of the resources and/or after provisioning of the resources. The monitoring of the workloads provides a summary of the workloads of the computing modules throughout the provisioning of the resources.

A request for a resource in the network is received; and, resources that are available in the network are identified. Units that are included in the resources are also identified. The metadata catalog is queried for operating experiences associated with the requested resource. The host system, which monitors the usage of resources, is selected from a plurality of systems based on the operating experiences associated with the requested resource.

The requested resource is provisioned by the host system based on the operating experiences associated with the resource. This includes assembling the units that are included in the requested resource and/or automatically allocating workloads of the computing modules dynamically at runtime based on the cataloging of the workloads in the metadata catalog. The metadata catalog is updated with an operating experience associated with the provisioning of the requested resource.

Another embodiment of the invention provides a system for workload optimization in a network, including a metadata catalog having operating experiences of resources in the network. The operating experiences include: minimum system requirements for provisioning the resources, software utilized by the resources, hardware utilized by the resources, network connections used by the resources, CPU usage of the resources, RAM usage of the resources, hard drive usage of the resources, external storage device usage by the resources, errors encountered while provisioning the resources, stability of the resources, uptime of the resources, a system that previously provisioned the requested resource, a list of resources on the host system, a location of the host system, and/or workload data of computing modules in the network during provisioning of the resources and/or after provisioning of the resources, and wherein the workload data includes a summary of workloads of the computing modules throughout the provisioning of the resources. The host system monitors operating experiences of the resources and sends the operating experiences to the metadata catalog.

A processor queries the metadata catalog for operating experiences associated with a requested resource. The host system is selected from a plurality of systems based on the operating experiences associated with the requested resource. The host system identifies resources that are available in the network and units that are included in the resources.

The requested resource is provisioned by the host system by assembling units that are included in the requested resource. The requested resource is provisioned based on the operating experiences associated with the resource. Workloads of the computing modules are automatically allocated dynamically at runtime by the host system based on the workload data in the metadata catalog. The metadata catalog is updated by the host system with an operating experience associated with the provisioning of the requested resource.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
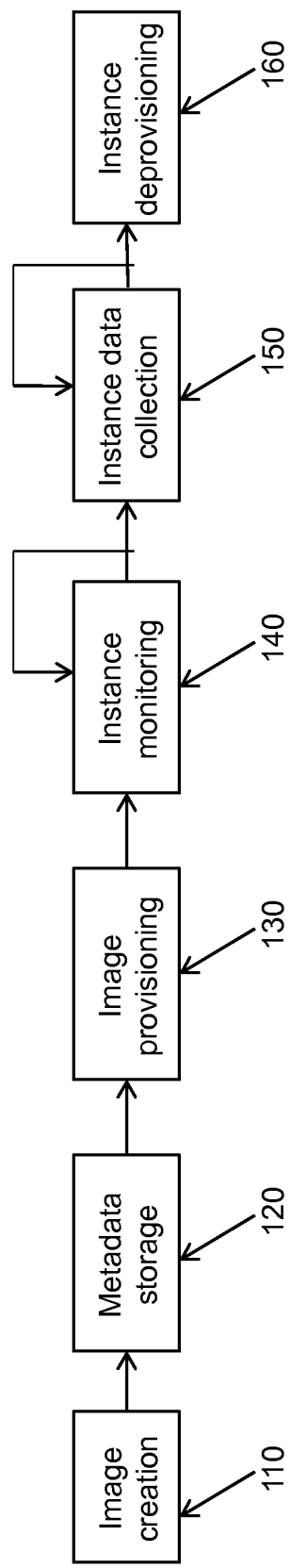
FIG. 1 is a flow diagram illustrating a method for workload optimization according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention includes systems, methods, and computer program products for monitoring operating experiences of images to improve workload optimization in cloud computing environments. More specifically, metadata of an instantiated image is captured to create a profile of operational characteristics, which is subsequently utilized to manage future workloads. Images have existing metadata about the content and desired attributes of the contained bits that make up the image. Once an image is instantiated, additional characteristics (e.g., hardware requirements, overall shared system load, etc.) are stored in an electronic database (e.g., metadata catalog). The additional characteristics of the image can vary greatly by the context in which they are instantiated.

The past performance of an image may be useful for determining future workload management options—both for the image and the system it is being provisioned to. Workloads are characterized by the execution of code, data storage, and network transfers associated with work. Workloads drive a certain level of resource utilization that can benefit from understanding optimal placement in a datacenter (e.g., cloud computing environment). Images alone often do not contain adequate information to intelligently manage datacenter workloads. An embodiment of the invention optimizes workloads by leveraging dynamic profile creation, which extends and informs the image, to enable a network management system or a cloud operator to manage the workloads.

At least one embodiment of the invention monitors, records, and correlates massive amounts of operational behavior associated with instantiated images. An image, also known as a "system image" or "template", is a non-volatile form of a running computing system. Images often materialize as one or more files. In at least one embodiment of the invention, an image is made of the current state of a disk or RAM. In a cloud computing environment, this image is more like a template in that some part of the system is made dynamic. For example, specific data elements (e.g., parameters, files, executables, etc.) are managed external to the image and composed at instantiation time. In this case, the collective ingredients make up the image enabling customized versions of essentially the same image.

Images tend not to be virtual; rather, they are the real skeletons that virtual machines are made of. Images are templates that allow numerous, almost identical, systems to be instantiated in a cloud computing environment. Because images are the skeletons of systems, they do not inherently have operational characteristics. By definition, these attributes are absent, as the target run environment has not yet been determined. By monitoring, recording, and correlating the operational characteristics of the running image (i.e., the instance) the cloud computing environment is able to dynamically profile them allowing for intelligent workload optimization.

For example, in one embodiment of the invention, a first image is allocated ¼ of the CPU (processor) usage. The workload optimization system identifies that the first image consistently uses all of the allocated CPU usage. Therefore, the system automatically updates the metadata for the first image to recommend additional CPU usage. In another example, a second image runs software that does not reliably work when swapped to disk (e.g., moved out of RAM and onto a hard drive). While the system may or may not be aware of the software for the second image, the system identifies a pattern where the second image spikes CPU and holds network connections until timeout as it is reloaded into memory. These events, identified over many provisioning and potentially numerous locations, are correlated to provide the cloud provisioning system with guidance in order to avoid system congestion when resources are routinely swapped out. In another example, a third image fails to provision on a specific piece of hardware. There is no reason it should fail based on the existing metadata, but the historical operational characteristics indicate that the third image will not run on host A, B, or C. It has run successfully on D, E and F. When the operational metadata catalog is queried, the cloud provisioning system is not recommended to provision the third image on host systems A, B, or C.

FIG. 1 is a flow diagram illustrating a method for workload optimization according to an embodiment of the invention. An image is created (110), wherein initial minimum system requirements are associated with the image. Metadata about the image is stored in a metadata catalog (120). The metadata is stored as part of the image and/or the metadata is managed in an external library. The image is provisioned on a host system determined by a fitting algorithm (130). In at least one embodiment of the invention, the fitting algorithm randomly selects a host system, selects the first host system (a-z), selects the least crowded system, selects the least utilized system, and/or selects a system having operating characteristics that meet CPU and/or memory requirements.

Operating characteristics are monitored each time the image is provisioned (140). As described more fully below, operating characteristics include CPU usage, memory usage, network consumption, and issues occurring during over-commit (e.g., when RAM or CPU are in contention with other instances). An operating profile is created by storing the operating characteristics of the image in the metadata catalog (150). Every time the image is provisioned, the operating profile is updated. Similarly, operating characteristics of the image are stored in the metadata catalog when the instance is deprovisioned and the operating profile is updated (160). In at least one embodiment of the invention, the CPU, RAM, and storage are distributed such that the resulting computer is not a single virtual unit but a dynamic assemblage of parts.

Figure 2:
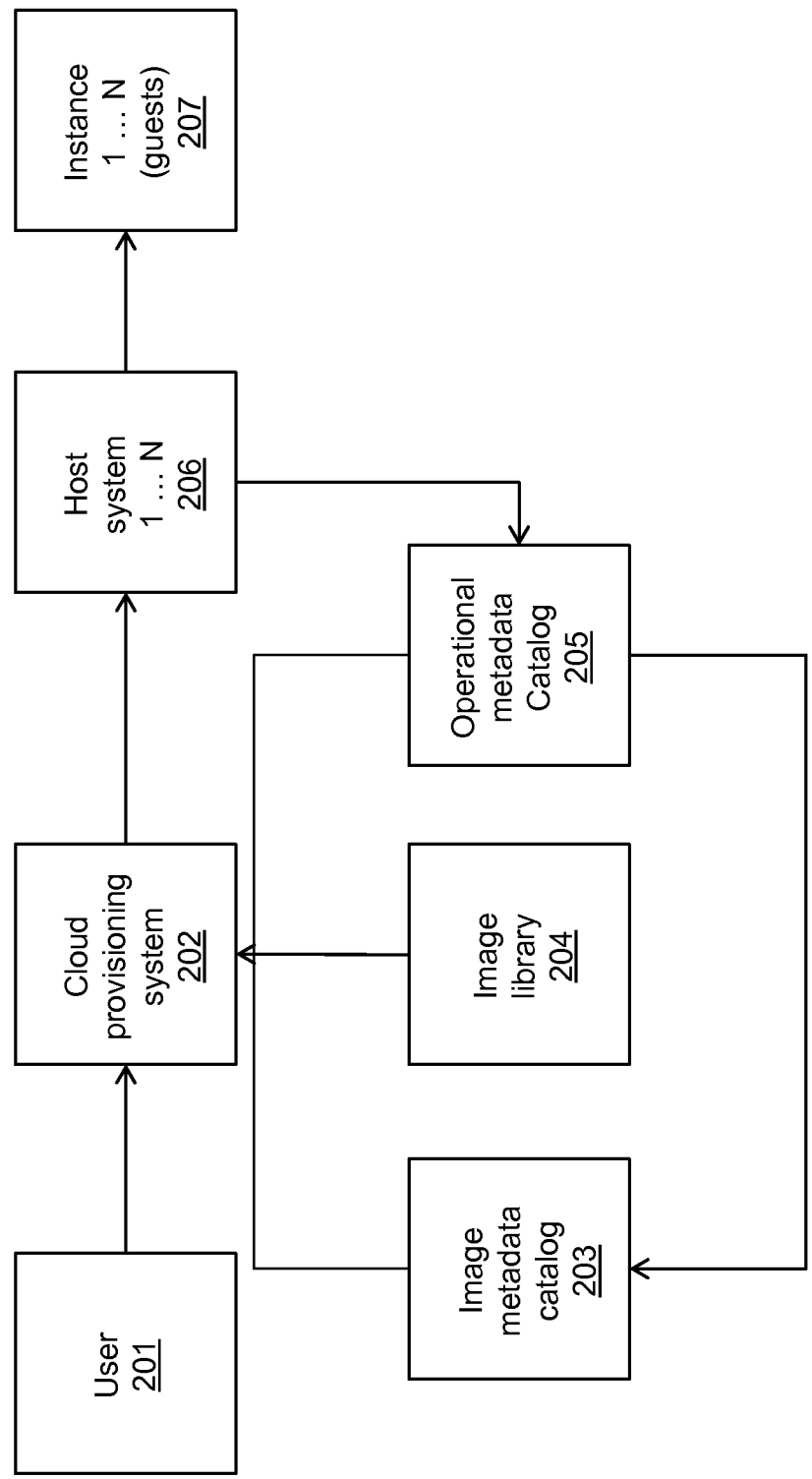
FIG. 2 illustrates a system and method for workload optimization according to an embodiment of the invention.

FIG. 2 illustrates a system and method for workload optimization in a cloud computing environment according to an embodiment of the invention. A user (or system) 201 interested in provisioning a resource submits a request to a cloud provisioning system 202 (210). In response to the request, the cloud provisioning system 202 queries an image metadata catalog 203, which returns a list of available images for provisioning (220). The user 201 selects an image from the list and requests for it to be provisioned. In at least one embodiment of the invention, the image metadata catalog 203 includes a list of images that result from a dynamic query (e.g., queries for compatible images run at predetermined intervals).

The cloud provisioning system 202 receives the request and connects to the image metadata catalog 203 to obtain data related to the requested image, e.g., minimal or suggested resource definitions. The cloud provisioning system 202 connects to an image library 204 to get the physical bits of the image to be realized (230). Furthermore, the cloud provisioning system 202 connects to an operational metadata catalog 205 to understand the operational characteristics of previous realizations of the image (240). In another embodiment of the invention, the data in the image metadata catalog 203 and operational metadata catalog 205 are present in a single metadata catalog (e.g., FIG. 1, the metadata catalog in 120). Initially, the operational metadata catalog 205 only has the base requirements for the image. In at least one embodiment, the operational characteristics include patterns in which the image has resided successfully in the past and a list of other images that the requested image does not reside well with.

The cloud provisioning system 202 uses the information obtained from the operational metadata catalog 205 to select a best fit across all of the potential host systems (250). As described below, the host system 206 (e.g., a hypervisor) is selected by fitting algorithms considering past operational characteristics. The host system 206 instantiates the image, thereby creating an instance 207 (260).

The host system 206 periodically reports operational characteristics of instantiated images to be stored in the operational metadata catalog 205 (270). In at least one embodiment, the periodic reports include overall contention for resources on the host system 206, a list of other images on the host system 206, and/or workloads in the cloud computing environment (e.g., a summary of workloads throughout the entire provisioning process and/or individual snapshots of the workloads at particular points in time during the provisioning process). In another embodiment, the instantiation of images is monitored by a system that is external to the host system 206. The operational metadata catalog 205 runs trending algorithms and periodically updates the image metadata catalog 203 with recommended provisioning attributes (280).

Figure 3:
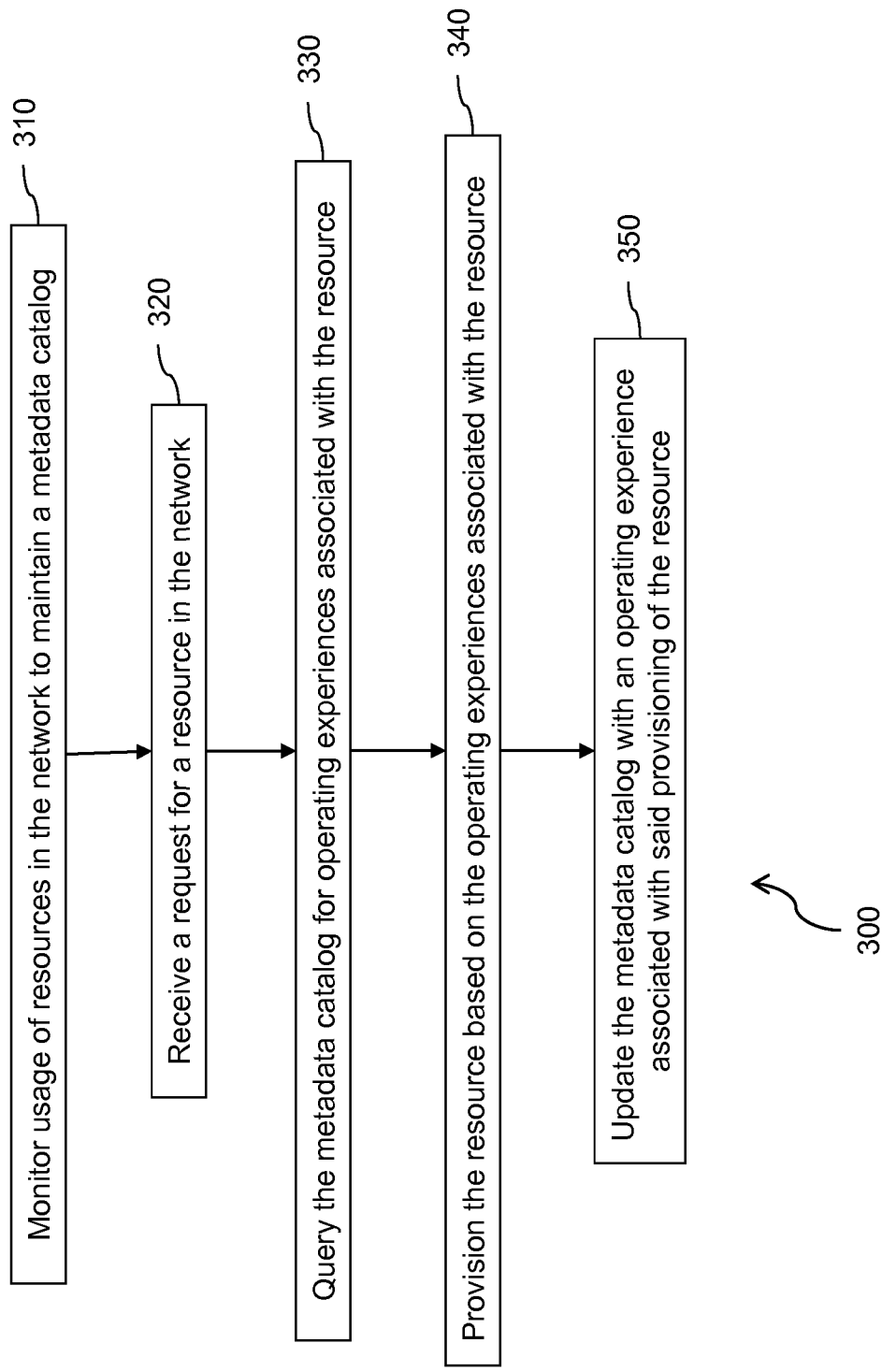
FIG. 3 is a flow diagram illustrating a method for workload optimization in a network according to an embodiment of the invention.
Figure 4:
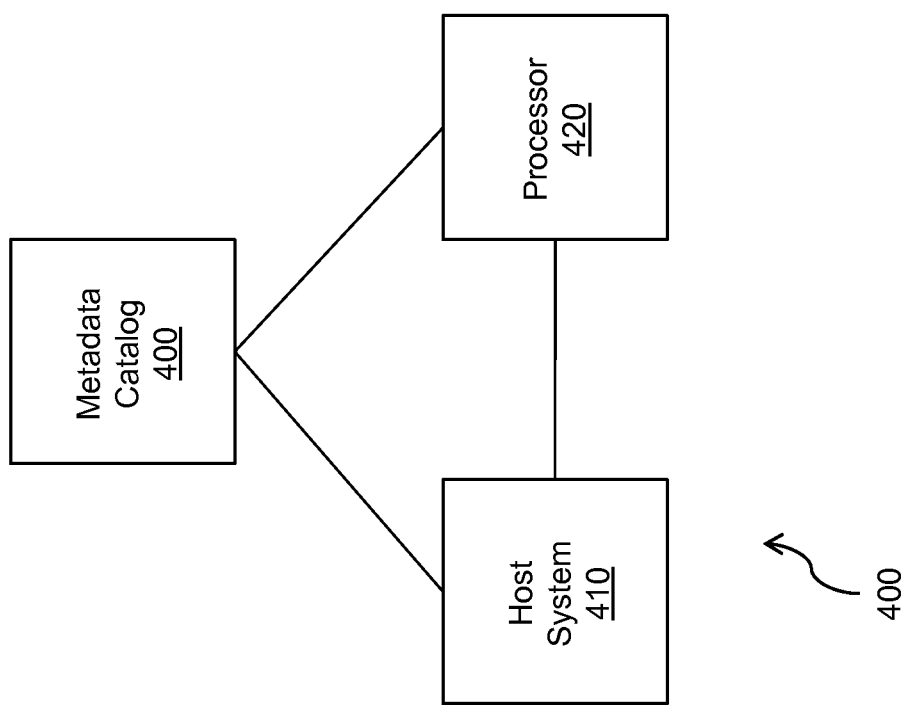
FIG. 4 illustrates a system for workload optimization in a network according to an embodiment of the invention.

FIG. 3 is a flow diagram illustrating a method 300 for workload optimization in a network according to an embodiment of the invention. In at least one embodiment of the invention, the method 300 is provided as a service for the network. FIG. 4 illustrates a system 400 for workload optimization in the network according to an embodiment of the invention (e.g., performing the method 300). Usage of resources (also referred to herein as "images") in the network is monitored to maintain a metadata catalog 410 of operating experiences of the resources (310). The operating experiences include minimum system requirements for running the resources, software utilized by the resources, hardware utilized by the resources, network connections used by the resources, CPU usage of the resources, RAM usage of the resources, hard drive usage of the resources, and/or external storage device usage by the resources. The operating experiences of the resources further include errors encountered while provisioning the resources, stability of the resources, uptime of the resources, system(s) that previously provisioned the resources, a list of resources on the host system, and/or a location of the host system (i.e., where the host system is located versus where traffic to the host system comes from). In at least one embodiment, workloads of computing modules in the network are cataloged during provisioning of the resources. In another embodiment, the workloads of the computing modules are cataloged after the provisioning of the resources to provide a summary of the workloads throughout the provisioning process.

The metadata catalog 410 is maintained/updated by a host system 420 and/or a processor 430. Although FIG. 4 illustrates that the processor 430 is external to the host system 420, the processor 430 is on the host system 420 in another embodiment. In yet another embodiment of the invention, the host system 410 is external to the system 400.

A request for a resource in the network is received (320). In at least one embodiment of the invention, the network is a cloud computing environment. In response to the request, resources that are available in the network are identified. Moreover, units (also referred to herein as "bits") that are included in the resources are also identified. The metadata catalog 410 is queried by the processor 430 for operating experiences associated with the requested resource (330).

The requested resource is provisioned (executed, employed, operated, ran) by the host system 420 based on the operating experiences associated with the resource (340). For example, in at least one embodiment of the invention, the host system 420 automatically allocates workloads of the computing modules in the network based on the workloads in the metadata catalog (i.e., the workloads observed during previous provisioning of the requested resource). This involves balancing workloads by moving tasks from over-utilized computing module(s) to under-utilized computing module(s)). In at least one embodiment, the automatic allocation of the workloads is performed dynamically at runtime (i.e., during the provisioning of the resource). The provisioning of the resource further includes retrieving and assembling (combining, collecting, gathering, or accumulating) the units that are included in the resource. In at least one embodiment, the host system is selected from a plurality of systems (e.g., in the network) based on the operating experiences associated with the requested resource. The metadata catalog is updated with the operating experience associated with the provisioning of the requested resource (350).

As will be appreciated by one skilled in the art, aspects of the present invention may be embodied as a system, method, service or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
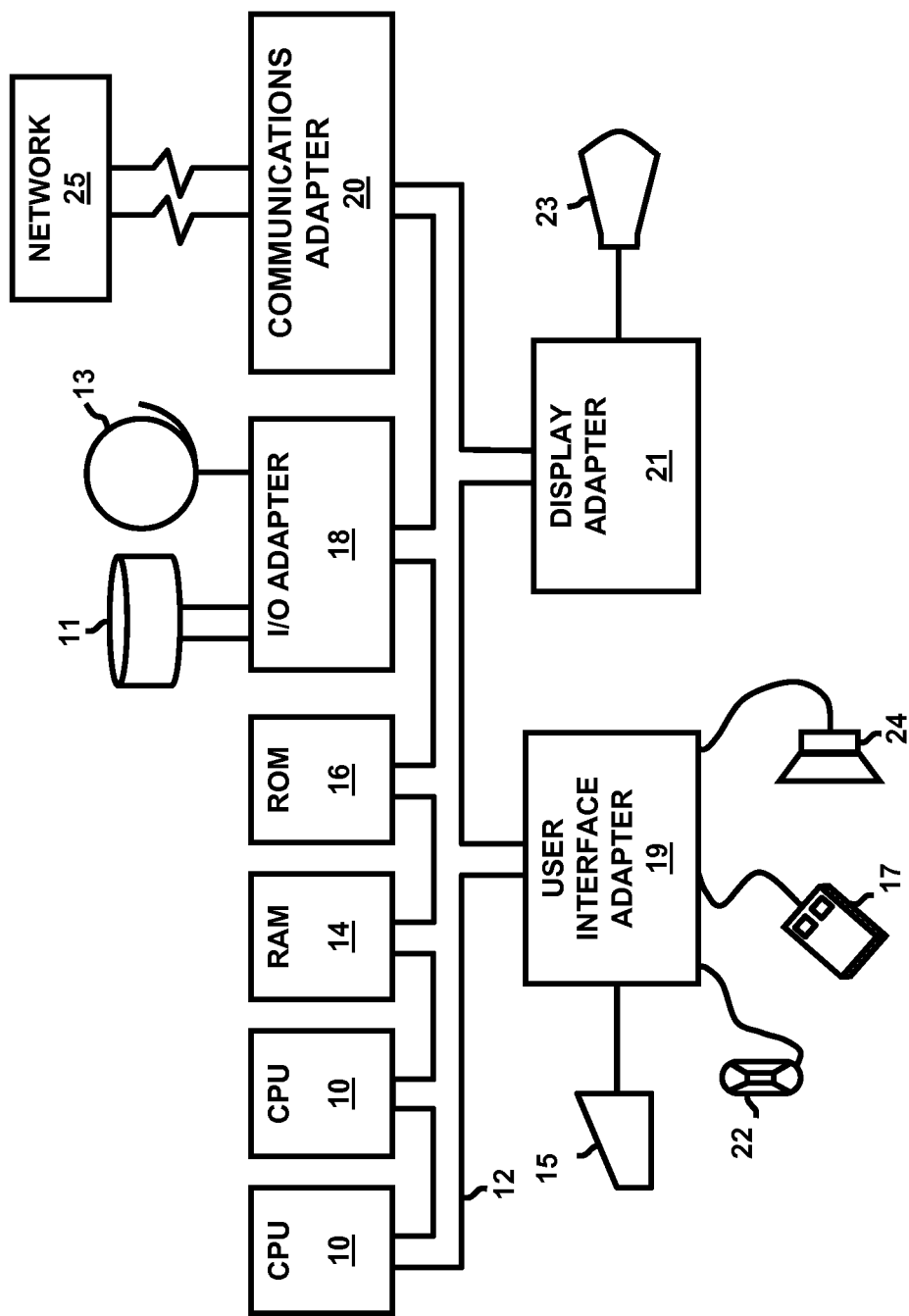
FIG. 5 illustrates a computer program product according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for workload optimization in a network, the network including a plurality of computing modules, said method including:

monitoring usage of resources in the network to maintain a metadata catalog of operating experiences of the resources, wherein the resources are templates that include foundational bits that allow a virtualization system to constitute an instance, and wherein the resources lack inherent operational characteristics prior to provisioning of the resources, the operating experiences of the resources including workloads of the computing modules during provisioning of the resources and workloads of the computing modules after the provisioning of the resources;

receiving a request for a resource in the network;

querying the metadata catalog for operating experiences associated with the requested resource;

selecting at least one host system to provision the requested resource based on at least one of workloads of the computing modules during at least one previous provisioning of the requested resource and workloads of the computing modules after the at least one previous provisioning of the requested resource;
provisioning the requested resource on the at least one selected host system; and
updating the metadata catalog with an operating experience associated with said provisioning of the requested resource.

2. The method according to claim 1, wherein the operating experiences of the resources further include at least one of: minimum system requirements for running the resources, software utilized by the resources, hardware utilized by the resources, network connections used by the resources, CPU usage of the resources, RAM usage of the resources, hard drive usage of the resources, external storage device usage by the resources, errors encountered while provisioning the resources, stability of the resources, uptime of the resources, a system that previously provisioned the resource, a list of resources on the host system, and a location of the host system.

3. The method according to claim 1, wherein said monitoring of the usage of resources is performed by the host system.

4. The method according to claim 1, further including, in response to said receiving of the request for the resource:
identifying resources that are available in the network; and
identifying units that are included in the resources.

5. The method according to claim 4, wherein said provisioning of the resource includes assembling units that are included in the resource.

6. The method according to claim 1, wherein the network includes a cloud computing environment.

7. The method according to claim 1, wherein the images comprise a non-volatile form of a running computing system, wherein the images allow numerous systems to be instantiated in a cloud computing environment.

8. A method for workload optimization in a cloud computing environment, said method including:
monitoring usage of images in the cloud computing environment to maintain a metadata catalog of operating experiences of the images, wherein the images are templates that include foundational bits that allow a virtualization system to constitute an instance, and wherein the images lack inherent operational characteristics prior to provisioning of the images, the operating experiences of the images including:
workloads of computing modules in the cloud computing environment during provisioning of the images and after the provisioning of the images, and
hardware requirements of the images;
receiving a request for a image in the cloud computing environment;
querying the metadata catalog for operating experiences associated with the requested image;
selecting at least one host system to provision the requested image based on:
workloads of the computing modules during at least one previous provisioning of the requested image,
workloads of the computing modules after the at least one previous provisioning of the requested image, and
hardware requirements of the requested image;
provisioning the requested image on the at least one selected host system, said provisioning of the requested image including automatically allocating workloads of the computing modules; and
updating the metadata catalog with an operating experience associated with said provisioning of the requested image.

9. The method according to claim 8, wherein said operating experiences of the images includes a summary of the workloads of the computing modules throughout the provisioning of the images, and wherein said automatically allocating of the workloads is performed dynamically at runtime.

10. The method according to claim 8, wherein the operating experiences of the images further include: minimum system requirements for running the images, software utilized by the images, hardware utilized by the images, cloud computing environment connections used by the images, CPU usage of the images, RAM usage of the images, hard drive usage of the images, external storage device usage by the images, errors encountered while provisioning the images, stability of the images, uptime of the images, a system that previously provisioned the image, a list of images on the host system, and a location of the host system.

11. The method according to claim 8, wherein said selecting of the at least one host system to provision the requested image is further based on minimum system requirements for running the requested image, software requirement of the requested image, network connection usage of the requested image, CPU usage of the requested image, RAM usage of the requested image, hard drive usage of the requested image, external storage device usage by the requested image, errors previously encountered while provisioning the requested image, stability of the requested image, uptime of the requested image, a system that previously provisioned the requested image, a list of images on the host system, and a location of the host system.

12. The method according to claim 8, wherein the images comprise a non-volatile form of a running computing system, wherein the images allow numerous systems to be instantiated in a cloud computing environment.

13. A system for workload optimization in a network, said system including:
a metadata catalog including operating experiences of images in the network, wherein the images are templates that include foundational bits that allow a virtualization system to constitute an instance, and wherein the images lack inherent operational characteristics prior to provisioning of the images, the operating experiences of the images in the network including workload data, the workload data including workloads of the computing modules during provisioning of the images and workloads of the computing modules after the provisioning of the images;
a processor for querying said metadata catalog for operating experiences associated with a requested image; and
a host system for provisioning the requested image based on the operating experiences associated with the requested image, and for updating said metadata catalog with an operating experience associated with the provisioning of the requested image, said host system being selected from a plurality of systems based on the workload data.

14. The system according to claim 13, wherein said host system automatically allocates workloads of the computing modules based on the workload data in said metadata catalog.

15. The system according to claim 14, wherein the workload data includes a summary of workloads of the computing modules throughout the provisioning of the images.

16. The system according to claim 14, wherein said host system automatically allocates the workloads of the computing modules dynamically at runtime.

17. The system according to claim 13, wherein the operating experiences of the images in the network further include at least one of: minimum system requirements for provisioning the images, software utilized by the images, hardware utilized by the images, network connections used by the images, CPU usage of the images, RAM usage of the images, hard drive usage of the images, external storage device usage by the images, errors encountered while provisioning the images, stability of the images, uptime of the images, a system that previously provisioned the requested image, a list of images on the host system, and a location of the host system.

18. The system according to claim 13, wherein said host system monitors operating experiences of the images in the network and sends the operating experiences to said metadata catalog.

19. The system according to claim 13, wherein said host system identifies images that are available in the network and units that are included in the images.

20. The system according to claim 13, wherein said host system provisions the requested image by assembling units that are included in the requested image.

21. The system according to claim 13, wherein the network includes a cloud computing environment.

22. The system according to claim 13, wherein said host system is selected further based on at least one of minimum system requirements for running the requested image, software requirement of the requested image, network connection usage of the requested image, CPU usage of the requested image, RAM usage of the requested image, hard drive usage of the requested image, external storage device usage by the requested image, errors previously encountered while provisioning the requested image, stability of the requested image, uptime of the requested image, a system that previously provisioned the requested image, a list of images on the host system, and a location of the host system.

23. The system according to claim 13, wherein the images comprise a non-volatile form of a running computing system, wherein the images allow numerous systems to be instantiated in a cloud computing environment.

24. A computer program product for workload optimization in a network, said computer program product comprising:
a computer readable storage medium;
first program instructions to monitor usage of images in the network to maintain a metadata catalog of operating experiences of the images, wherein the images are templates that include foundational bits that allow a virtualization system to constitute an instance, and wherein the images lack inherent operational characteristics prior to provisioning of the images, the operating experiences of the images including workloads of the computing modules during provisioning of the images and workloads of the computing modules after the provisioning of the images;
second program instructions to receive a request for a image in the network;
third program instructions to query the metadata catalog for operating experiences associated with the requested image;
fourth program instructions to select at least one host system to provision the requested image based on the at least one of workloads of the computing modules during at least one previous provisioning of the requested image and workloads of the computing modules after the at least one previous provisioning of the requested image;
fifth program instructions to provision the requested image on the at least one selected host system; and
sixth program instructions to update the metadata catalog with an operating experience associated with the provisioning of the requested image,
wherein said first, second, third, fourth, fifth, and sixth program instructions are stored on said computer readable storage medium.

* * * * *